(12) United States Patent
Peterson

(10) Patent No.: US 6,789,812 B2
(45) Date of Patent: Sep. 14, 2004

(54) VEHICLE ANTISWAY BAR

(75) Inventor: David Peterson, Collinsville, OK (US)

(73) Assignee: Featherlite, Inc., Cresco, IL (US)

( * ) Notice: Subject to any disclaimer, the term of this patent is extended or adjusted under 35 U.S.C. 154(b) by 0 days.

(21) Appl. No.: 09/970,629

(22) Filed: Oct. 4, 2001

(65) Prior Publication Data
US 2002/0093169 A1 Jul. 18, 2002

(51) Int. Cl.$^7$ .................................. B60G 21/055
(52) U.S. Cl. .................. 280/124.152; 280/124.107; 280/124.137; 267/188
(58) Field of Search ............... 280/124.152, 124.106, 280/124.107, 93.512, 5.511, 124.166, 124.13, 124.137, 124.149, 124.157, 124.162, 124.116; 267/188, 259, 189

(56) References Cited

U.S. PATENT DOCUMENTS

| | | | | |
|---|---|---|---|---|
| 2,961,253 A | * | 11/1960 | Allison | 280/124.106 |
| 3,105,699 A | * | 10/1963 | Peras | 280/124.106 |
| 3,831,970 A | * | 8/1974 | Muller | 280/124.137 |
| 4,691,937 A | | 9/1987 | Raidel | |
| 5,076,605 A | * | 12/1991 | Umeda | 280/124.107 |
| 5,549,320 A | | 8/1996 | Ellingsen | |
| 5,678,845 A | * | 10/1997 | Stuart | 280/124.116 |
| 5,967,536 A | | 10/1999 | Spivey et al. | |
| 6,056,305 A | * | 5/2000 | Pribyl | 280/124.157 |
| 6,073,714 A | * | 6/2000 | McHorse et al. | 180/89.14 |
| 6,105,984 A | * | 8/2000 | Schmitz et al. | 280/124.136 |
| 6,196,563 B1 | * | 3/2001 | Haycraft | 280/93.512 |
| 6,213,221 B1 | * | 4/2001 | Lewallen | 172/776 |
| 6,244,607 B1 | * | 6/2001 | Nishino | 280/124.107 |
| 6,394,474 B1 | * | 5/2002 | Warinner et al. | 280/124.104 |
| 6,585,276 B2 | * | 7/2003 | Boucquey | 280/124.135 |

* cited by examiner

Primary Examiner—David Dunn
(74) Attorney, Agent, or Firm—Merchant & Gould P.C.

(57) ABSTRACT

An antisway bar assembly and kit for the same for use in a automobile or a bus or other vehicle, the antisway bar assembly including an antisway bar including first and second ends and a center portion therebetween. Antisway bar assembly further includes first and second mounting arrangement for rotatably securing first and second ends of antisway bar. In one example embodiment, first and second mounting arrangement are mounted on a vehicle chassis or frame between a kingpin and an airbag on each end of front wheel axle assembly. A method for replacing a stock A-frame antisway bar assembly on a vehicle chassis including removing the stock A-frame assembly and coupling first and second mounting arrangement to the vehicle chassis and rotatably securing a first end and a second end of a replacement antisway bar to the first and second mounting arrangement, respectively.

23 Claims, 6 Drawing Sheets

VEHICLE ANTISWAY BAR

FIELD OF THE INVENTION

This invention relates to vehicle suspensions, and more particularly, to a vehicle Suspension antisway bat assembly and method of installation for the same.

BACKGROUND OF THE INVENTION

In currently available vehicle suspensions, it is common to provide an antisway bar to modify the performance of the vehicle. Antisway bars provide a stabilizing effect during turning and cornering. Antisway bars are generally U-shaped and connected at two end points to a vehicle axle. Additional brackets positioned between the two end points are typically used for additional support of the antisway bar.

When the vehicle moves fast through a turn, the vehicle tends to sway or roll to one side or the other as a result of the suspension springs being compressed more on one side than the other side, thereby lifting the end of the antisway bar closer to the frame on one side than on the other. This motion is translated across the antisway bar, causing the antisway bar arm on the opposite side to have a vertical lifting force at its connection to the axle. The reaction force from this lifting force then is transmitted up to the frame or chassis via the antisway bar frame linkages. One linkage will have a compressive force while the other one will have a tension force, thereby tending to reduce the vehicle sway or roll.

Referring to FIGS. 1 and 2, an example vehicle chassis (or frame) 100 including an antisway bar assembly 105 of the prior art is shown. Antisway bar assembly 105 includes an antisway bar 110, one or more mounting brackets 120, and two sandwich mounts 150. Antisway bar 110 has a first end 112 and a second end 114 and a central portion 116 therebetween. First end 112 and second end 114 each have an aperture (not shown) therethrough for receiving a pin 156. Pin 156 is coupled to the sandwich mount 150, with sandwich mount 150 securing each of first 112 and second 114 ends of antisway bar 110 to vehicle chassis 100.

Antisway bar assembly 105 is coupled to vehicle chassis 100 using the sandwich mount 150 on lower A-frame arms 130. Lower A-frame arms 130 are coupled to vehicle chassis 100 and have a distal end 132 and a proximal end 134. The sandwich mount 150 is secured to the distal end 132 of lower A-frame arm 130. Pin 156 is coupled to sandwich mount 150. Antisway bar 110 is rotatably secured onto pin 156 at each end of antisway bar 110.

Referring to FIG. 2, vehicle chassis 100 includes an axle assembly 102. Axle assembly 102 includes a king pin 160 around which a wheel assembly 162 rotates. Vehicle chassis 100 also includes an air bag 170. Air bag 170 acts to reduce forces transmitted from the wheel assembly 162 to the vehicle chassis 100. Air bag 170 is mounted between an upper air bag mounting bracket 174 and a lower air bag mounting bracket 172. Lower air bag mounting bracket 172 is typically removably secured to king pin 160 using fasteners (not shown). Upper air bag mounting bracket 174 is fixedly coupled to vehicle chassis 100.

This configuration is used in many vehicle types, including automobiles and busses. This configuration for the commonly available system described is not completely satisfactory in that the antisway bar tends to be located well below the vehicle's center of roll or roll center, thereby hindering the ability of the antisway bar to stabilize the vehicle. The center of roll is an imaginary point about which a vehicle rotates while in a turn. Each axle has its own roll center. The higher the roll center, the more unsteady the vehicle will feel in a turn. The further the antisway bar is located far from the roll center, the more the traction of the vehicle is reduced, and extreme stresses are placed on the antisway bar and on the frame brackets to which the antisway bar is coupled, thereby causing fatigue and possible failure of the antisway bar or bracket. A need exists for improvements.

SUMMARY OF THE INVENTION

In one embodiment, the present invention is directed to an antisway bar suspension assembly and kit for the same for mounting on a vehicle chassis comprising a first mounting arrangement mounted to the vehicle chassis adjacent a first airbag, a second mounting arrangement mounted to the vehicle chassis adjacent a second airbag, and an antisway bar having a first end, a second end, and a central portion, the first end is received into the first mounting; and the second end is received into the second mounting arrangement.

In another embodiment, the present invention is directed to method of installing an antisway bar system on a vehicle suspension assembly comprising the steps of installing a first mounting arrangement on a first axle assembly of the vehicle, installing a second mounting arrangement on a second axle assembly of the vehicle and securing the first and second ends of the antisway bar into the mounting arrangement.

DETAILED DESCRIPTION OF THE PREFERRED EMBODIMENT

Description of an Example Embodiment of the Present Invention

Figure 1:
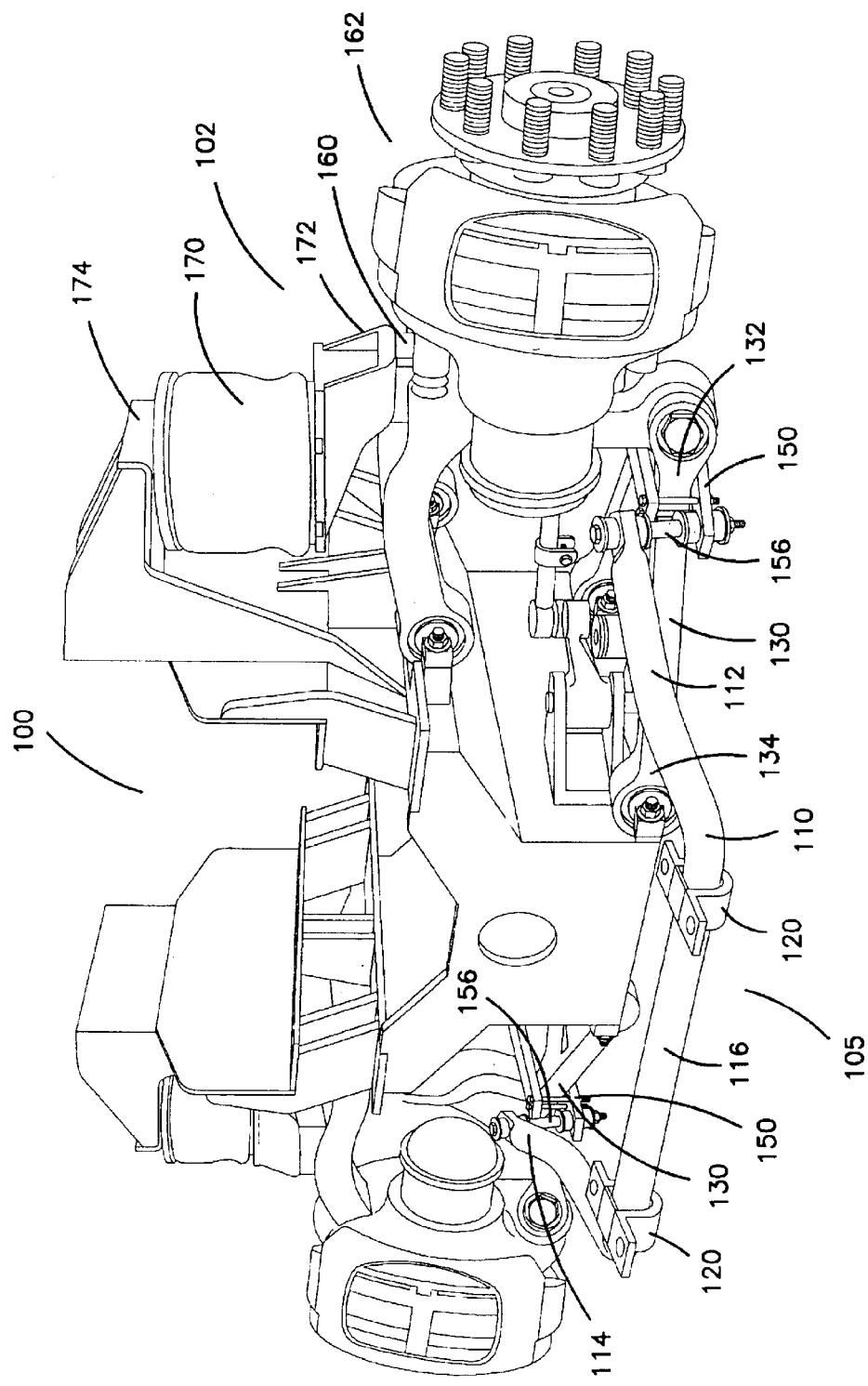
FIG. 1 is a perspective view of a portion of a vehicle chassis including an antisway bar assembly of the prior art.
Figure 2:
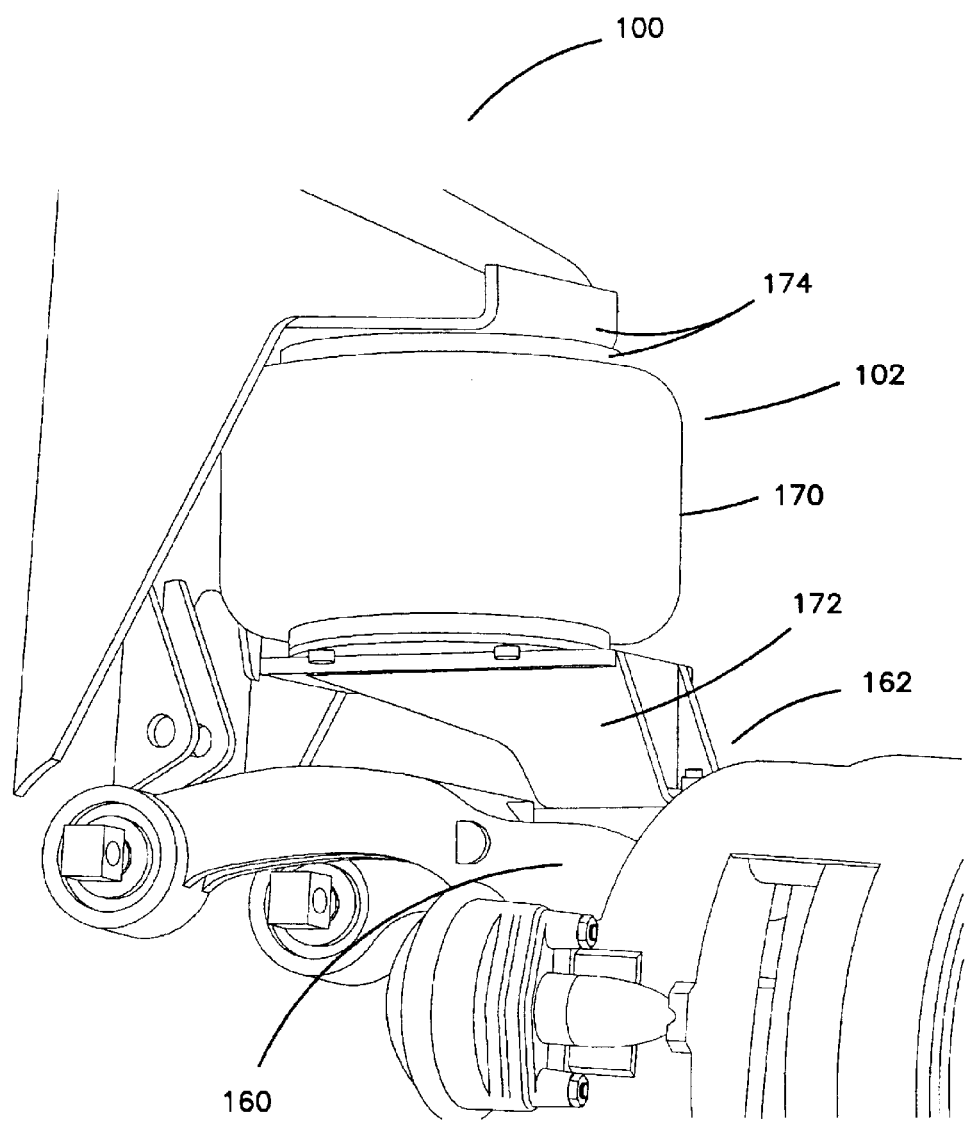
FIG. 2 is a perspective view of a close-up view of a portion of the vehicle chassis of FIG. 1.
Figure 3:
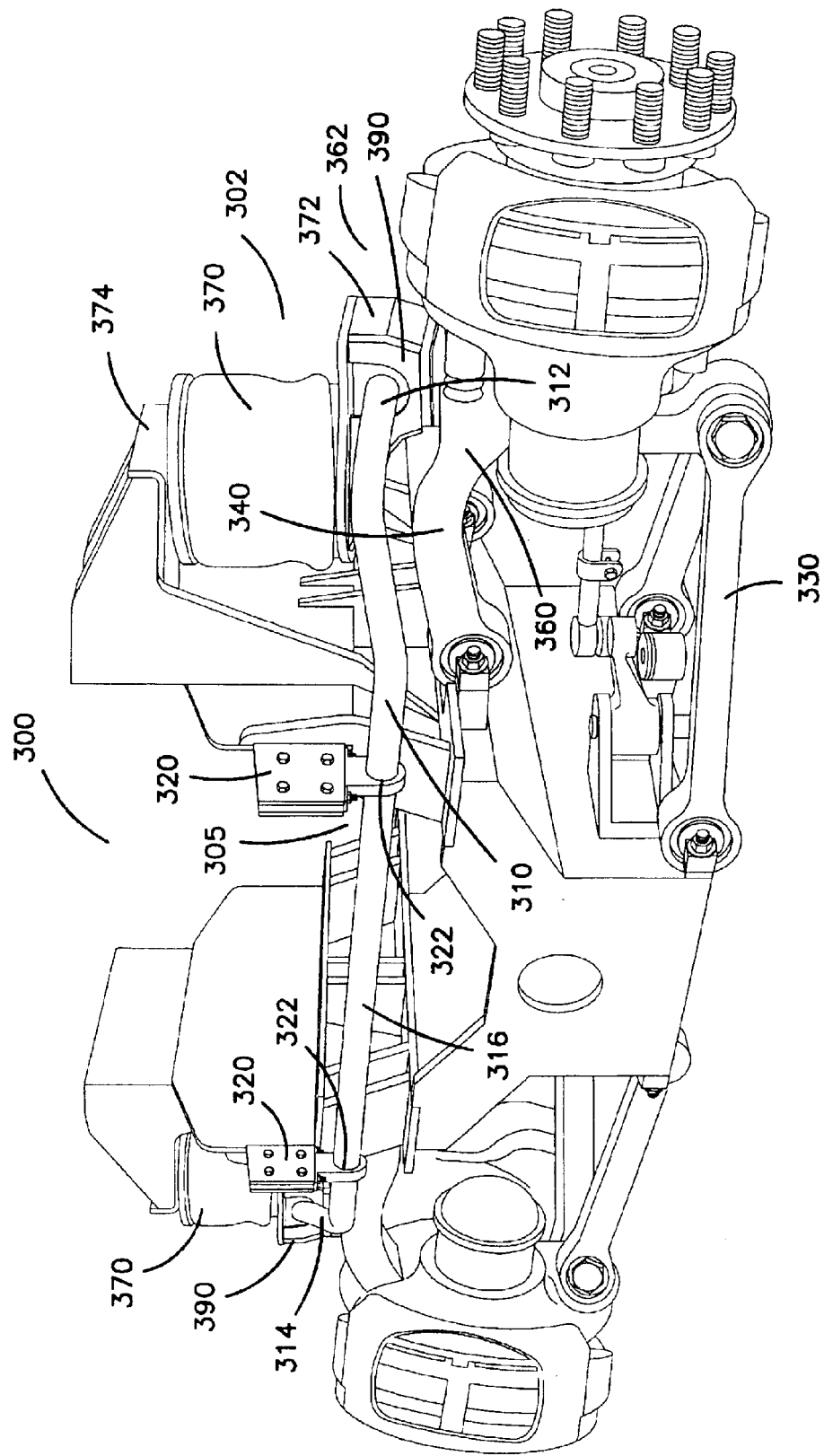
FIG. 3 is a perspective view of a portion of a vehicle chassis showing an example embodiment of an antisway bar assembly of the present invention.
Figure 4:
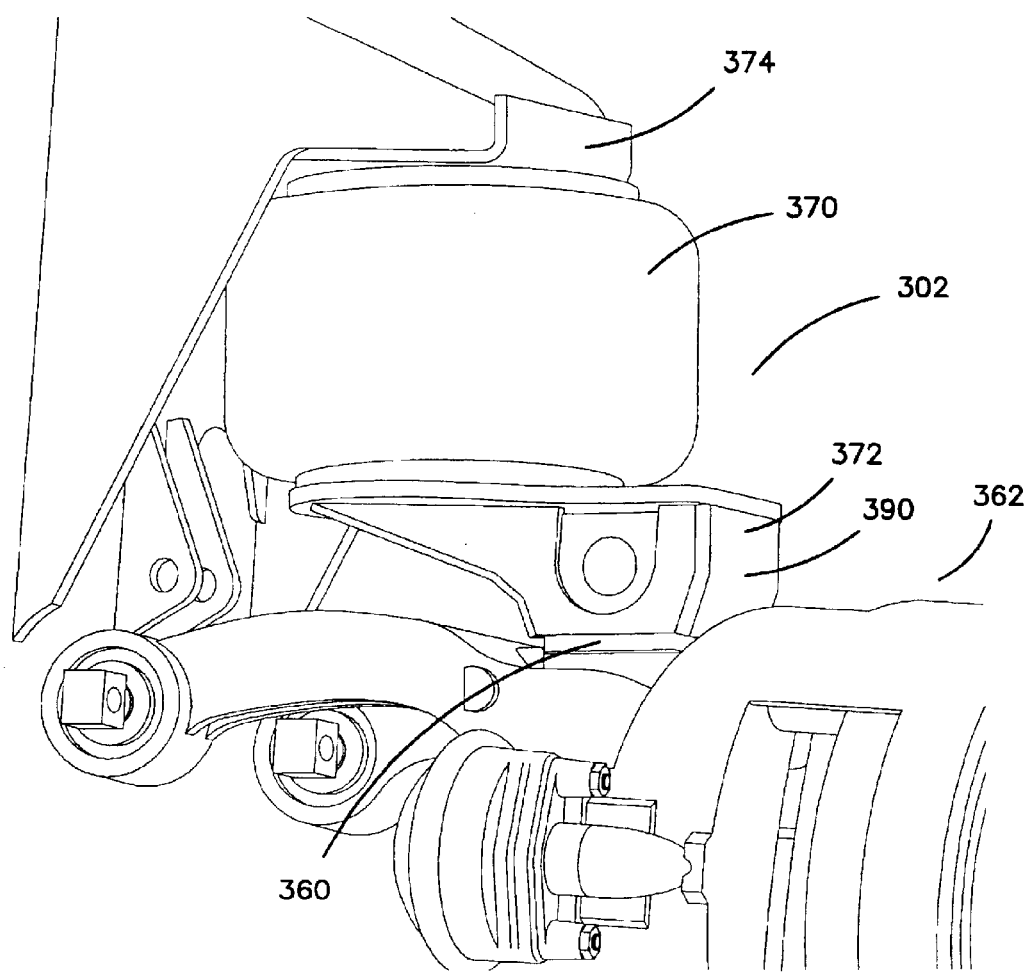
FIG. 4 is a close-up view of a portion of the vehicle chassis of FIG. 3 showing an example embodiment of one end of the antisway bar assembly of the present invention.
Figure 5:
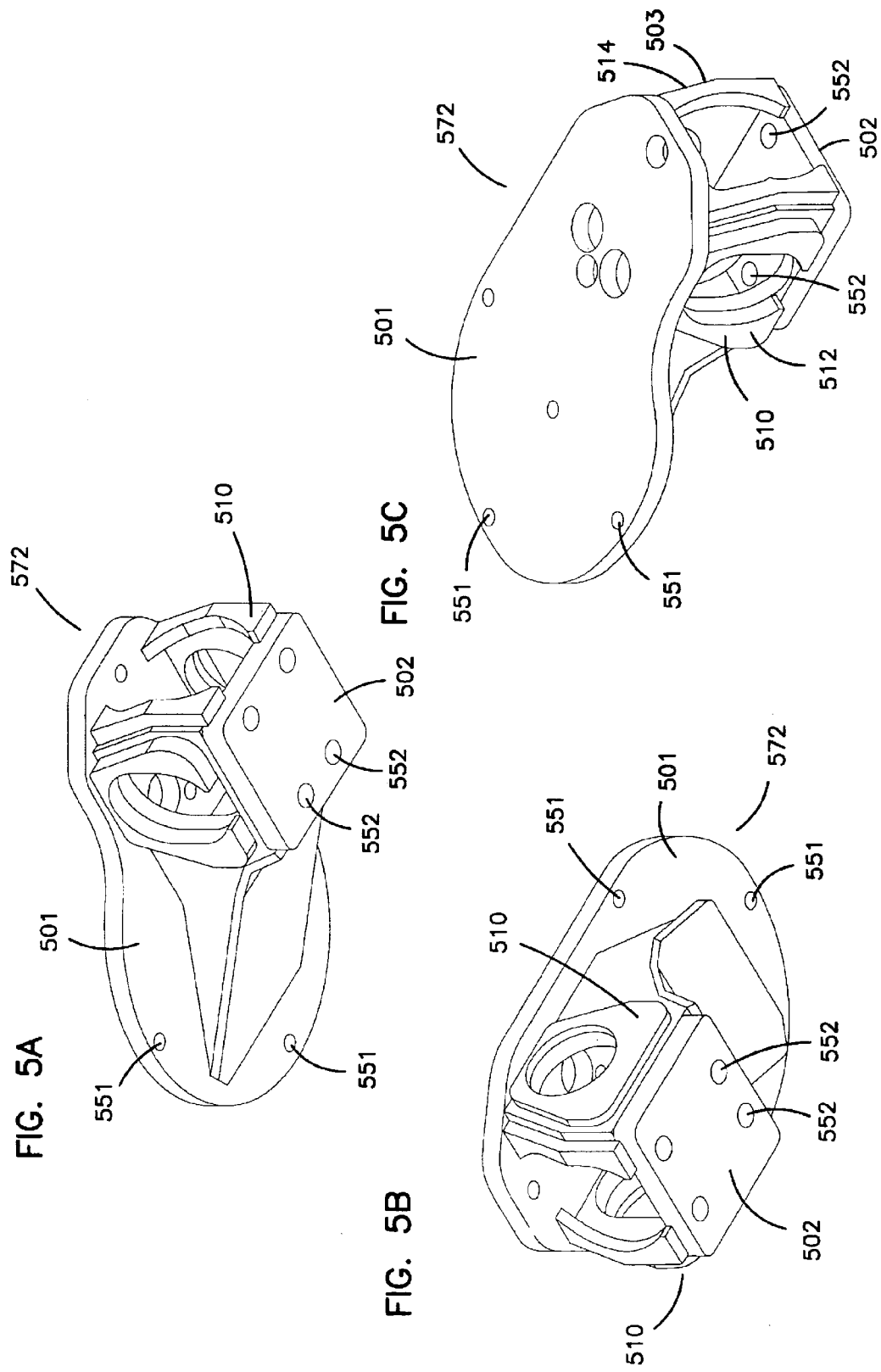
FIGS. 5A–C are perspective views of an example embodiment of a mounting arrangement without a bearing shown of FIGS. 3 and 4.

Referring to FIGS. 3 and 4, shown is a portion of a vehicle chassis 300 incorporating an example embodiment of an antisway bar assembly 305 of the present invention. Vehicle chassis 300 includes an axle assembly 302. Axle assembly 302 includes a king pin 360 around which a wheel assembly 362 rotates. Axle assembly 302 also includes an air bag 370. Air bag 370 acts to reduce forces transmitted from the wheel assembly 362 to the vehicle chassis 300. In the example embodiment shown, air bag 370 is mounted between an upper air bag mounting bracket 374 and a lower air bag mounting bracket 372. Lower air bag mounting bracket 372 is removably secured to king pin 360 using fasteners (not shown). Upper air bag mounting bracket 374 is also coupled to vehicle chassis 300.

Antisway Bar Assembly

Antisway bar assembly 305 includes antisway bar 310 coupled to vehicle chassis 300. Antisway bar 310 has a first end 312, a second end 314 and a center portion 316 therebetween. Antisway bar assembly 305 further includes mounting arrangement, for example 390, one on each axle assembly 302, for receiving first end 312 and second end 314 of antisway bar 300 for coupling antisway bar 300 to vehicle chassis 300. Antisway bar assembly 305 can be used in many types of vehicles, including, for example, an automobile or a bus.

Referring to FIG. 3, center portion 316 of antisway bar 310 can optionally be rotatably secured in an opening 322 passing axially through one or more frame mounting brackets 320. In the example embodiment shown, frame mounting brackets 320 are coupled to vehicle chassis 300 and support center portion 316 of antisway bar 310.

It is believed that an advantage of the present invention shown is that antisway bar 310 can be moved closer to the vehicle center of roll than in the lower A-frame arm mounting method. Also, where the vehicle configuration allows, ends 312, 314 of antisway bar 310 can be spaced further apart than when using traditional A-frame suspension. This allows a smaller diameter of the antisway bar 310 to be used. For example, the central portion 316 of the antisway bar 310 can have a diameter of less than 1.5 inches. Generally, antisway bar 310 functions as a spring, and as such is made of spring steel, or some form of hardened steel. Alternatively, antisway bar 310 can be made from 50,000 tensile strength mild steel.

Description of Mounting Arrangement

Referring to FIGS. 3 and 4, in the example embodiment shown, mounting arrangement, such as 390, is integrated into air bag lower mounting bracket 372. Air bag lower mounting bracket 372 is located between an air bag 370 and a king pin 360 on the axle assembly 302. Kingpin 360 is further coupled to vehicle chassis 300 through a lower A-frame arm 330. Air bag 370 is further coupled to vehicle chassis 300 through the air bag upper mounting bracket 374.

Mounting Bracket With Bearing

Referring to FIGS. 5A–C and 6, shown is an example embodiment of the mounting bracket 372 of FIGS. 3 and 4. Air bag lower mounting bracket 372 includes a first plate 501 and a second plate 502 that are generally parallel. First plate 501 mates to upper end of kingpin (not shown). Second plate 502 mates with lower section of air bag (not shown). Air bag lower mounting bracket 372 further includes a bearing housing 510 for receiving and rotatably securing end of antisway bar (not shown). Bearing housing 510 further includes a first faceplate 512 and a second faceplate 514. First and second faceplates 512, 514 have an opening 532 therethrough to receive end of antisway bar (not shown). Bearing housing 510 is able to receive and hold a bearing (not shown in FIGS. 5A–C).

First plate 501 has one or more holes 551 for use in fastening first plate 501 to kingpin 360. Second plate 502 has one or more holes 552 for use in fastening second plate 502 to airbag 370. Examples of fasteners used to fasten first and second plates 501, 502 to kingpin 360 and airbag 370, respectively, are bolts or rivets. One of skill in the art will recognize that alternative fastening methods can be used to fasten first and second plates 501, 502 to their respective mating devices. For example, instead of using bolts or rivets, the parts could be welded together.

Mounting bracket 510 also includes a housing 530 having opening 532. Housing 530 is located between first and second plates 501, 502. In addition to securing bearing 550, housing 530 adds to the structural capacity of mounting bracket 510. Housing 530 also helps protect components within from exposure to contaminants or the elements.

Figure 6:
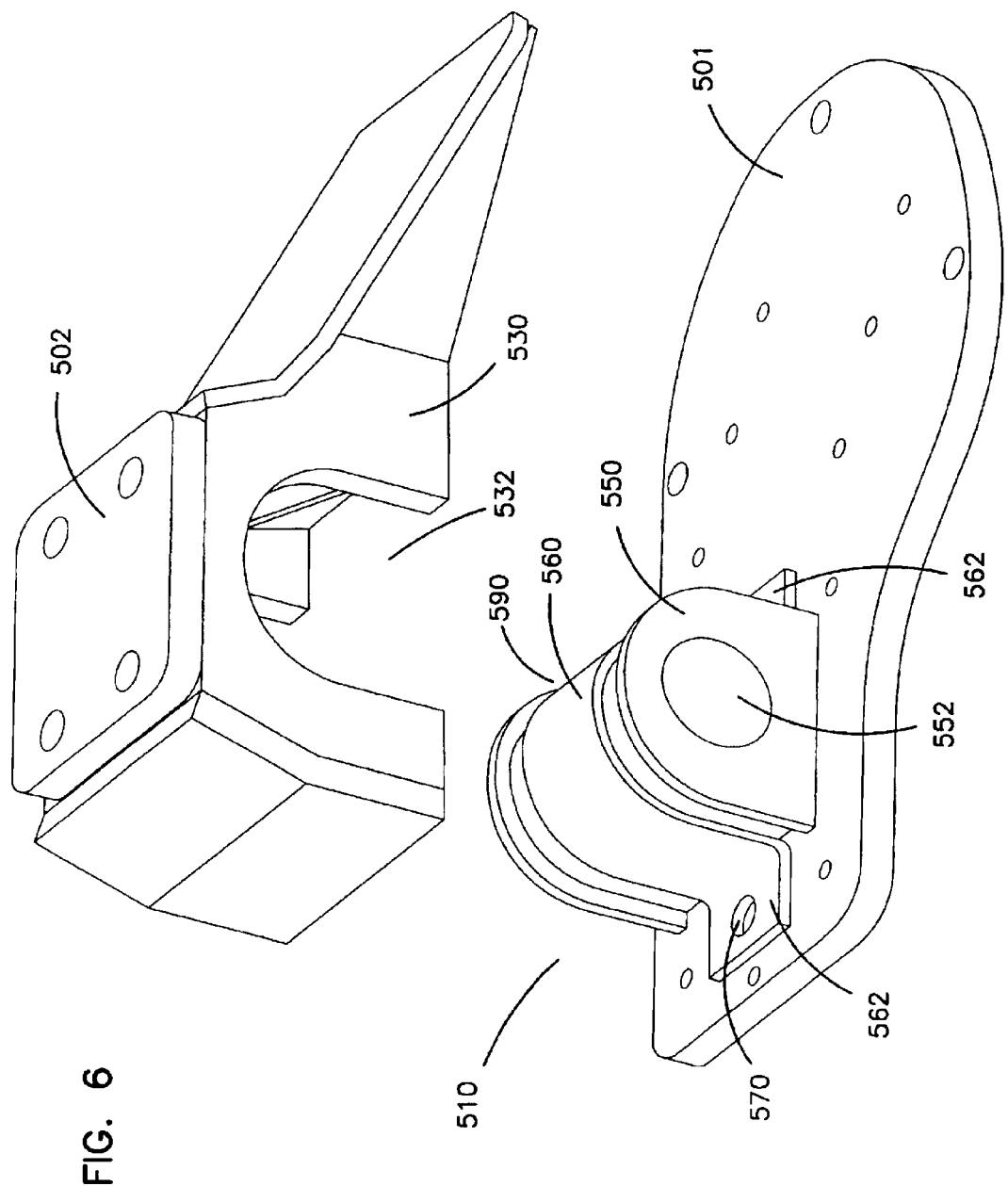
FIG. 6 are exploded perspective views of the example embodiment of the mounting arrangement having a bearing of FIGS. 3 and 4.

Referring to FIG. 6, bearing 550 is coupled to first plate 501 with fastening arrangement 590. In the example embodiment shown, fastening arrangement 590 is a semi-circular strip 560 having flanges 562 on each end. Strip 560 couples bearing 550 to first plate 501 using fasteners 570 securing flanges 562 of strip 560 to first plate 501. Examples of fasteners 570 are, for example, bolts or rivets. Bearing 550 has axial opening 552 for receiving end of antisway bar (not shown). Before mounting bracket 510 is coupled to vehicle chassis (not shown), housing 530 is secured to first plate 501, wherein opening 532 is co-axially located with respect to opening 552 in bearing 550.

Bearing 550 can be made of any material of suitable strength to receive and secure end of antisway bar (not shown). Preferably, bearing 550 is made from bronze, polyurethane, or composite materials. More preferably, bearing 550 is made from ultra-high molecular weight polyethylene. Bearing 550 can also be mounted and secured within housing 530 without fastening by using housing 530 and plates 501, 502 to keep bearing 550 from movement within mounting arrangement 390. Other types of bearings used are when using a ball or a taper bearing.

The orientation of the lower air bag mounting bracket 372 shown is for use on an axle assembly 302 on the driver's side (United States standard is that driver's side is on the left of vehicle as seen facing from rear to front of vehicle) of vehicle. One of skill in the art will appreciate that left and right mounting arrangements will generally be mirror images of one another to account for the side of vehicle they are used on. One of skill in the art will also appreciate that the mounting arrangement selection and configuration will depend on the variation found in the various types of vehicle chassis available. Each particular mounting arrangement will also vary depending on whether it is used on the driver's side or passenger's side of the vehicle.

Method of Installing Example Embodiment of the Present Invention

Vehicle chassis as supplied from factory can include a stock lower A-frame arm antisway bar assembly and the antisway bar assembly of the present invention could be installed to replace the stock lower A-frame arm antisway bar assembly. In other cases, it would be desirable to incorporate the antisway assembly of the present invention into the vehicle chassis at the factory.

Referring to FIGS. 3 and 4, antisway bar assembly 305 of the present invention can be installed at the factory when the vehicle chassis is initially built or can be retrofitted to replace the lower A-frame arm suspension assembly. The antisway bar assembly 305 of the present invention is installed in a vehicle by installing mounting arrangement, such as 390, on vehicle chassis 300. First end 312 and second end 314 of antiswaybar 310 are then rotatably secured into their respective mounting arrangement. In the example embodiment shown, mounting arrangement 390 includes air bag lower mounting bracket 372 secured between king pin 360 and air bag 370. If further support is necessary or desired, center portion 316 of antisway bar 310 can then be coupled to vehicle chassis 300 for support using one or more frame mounting brackets 320.

When vehicle chassis from the factory includes an antisway bar assembly attached to the lower A-frame arm in its stock configuration, the lower A-frame arm antisway bar assembly can be removed prior to or after installation of antisway bar assembly 305 of the present invention.

Description of Parts Kit for Example Embodiment of Present Invention

In another example embodiment of the present invention, a kit of components for installing the antisway bar assembly of the present invention in a vehicle is provided. An advantage of such a kit is that the kit allows the antisway bar assembly 305 of the present invention to be installed as an aftermarket item. The kit includes an antisway bar 310 having a right end 312, a left end 314, and a central portion 316 therebetween. One of skill in the art would recognize that the configuration of the antisway bar 310 would vary from vehicle to vehicle and also along with the desired mounting location.

The kit further includes mounting arrangements 390 for coupling ends 312, 314 of antiswaybar 310 to vehicle chassis or frame. In one example embodiment, a mounting arrangement 390 includes a right mounting bracket 372 constructed to replace a right lower air bag mounting bracket, the right mounting bracket further including a first mounting bearing 550 for receiving and securing the right end 312 of the replacement antisway bar 310. Mounting arrangement 390 further includes a left mounting bracket (such as a mirror image of 390) constructed to replace a left lower air bat mounting bracket, and the left mounting bracket further includes a second mounting bearing 550 for receiving and securing the left end 314 of the replacement antisway bar 310. Tn another example embodiment, the kit further includes a one or more front mounting brackets 320 capable of being secured to the front of the vehicle chassis wherein each front mounting bracket 320 would include a bearing with an opening 322 therethrough, wherein the antisway bar 310 would pass through and be supported by the bearing when the kit was assembled into the vehicle chassis.

It will be clear that the present invention is well adapted to attain the ends and advantages mentioned as well as those inherent therein. While the presently preferred embodiment has been described for purposes of this disclosure, various changes and modifications may be made which are well within the scope of the present invention. Numerous other changes may be made which will readily suggest themselves to those skilled in the art and which are encompassed in this spirit of the invention disclosed and as defined in the appended claims.

What is claimed is:

1. An antisway bar suspension assembly for use on a vehicle chassis comprising:
   a first mounting arrangement coupled between a first kingpin and a first airbag;
   a second mounting arrangement coupled between a second kingpin and a second airbag;
   an antisway bar having a first end, a second end, and a central portion;
   the first end being secured into the first mounting arrangement;
   the second end being secured into the second mounting arrangement; and
   the central portion being rotatably coupled to the vehicle chassis.

2. The antisway bar suspension assembly of claim 1 wherein the first mounting arrangement is secured to the first airbag and the second mounting arrangement is secured to the second airbag.

3. The antisway bar suspension assembly of claim 1 further including a frame mounting bracket, the frame mounting bracket having an opening therethrough along an axial-direction of the frame mounting bracket and the central portion of the antisway bar being rotatably secured through the opening to couple the central portion to a frame portion of the vehicle chassis.

4. The antisway bar suspension assembly of claim 1 wherein the first mounting arrangement includes a first housing and the second mounting arrangement includes a second housing.

5. The antisway bar suspension system of claim 1 wherein the central portion of the antisway bar has a diameter of less than 1.5 inches.

6. The antisway bar suspension system of claim 1 wherein the first mounting arrangement is a first lower airbag mounting bracket and the second mounting arrangement is a second lower airbag mounting bracket.

7. The antisway bar suspension system of claim 6 wherein the first lower airbag mounting bracket includes a first bearing and the second lower airbag mounting bracket includes a second bearing.

8. The antisway bar system of claim 7 wherein the first and second bearings are made from ultra-high molecular weight polyethylene.

9. A kit of components for installing a antisway bar in a vehicle having a chassis comprising a frame, a first king pin, a first airbag, a second king pin, and a second air bag, the kit comprising:
   a first mounting bracket that is configured to be coupled between the first king pin and the first airbag;
   a second mounting bracket that is configured to be coupled between the second king pin and the second airbag; and
   an antisway bar having a first end, a second end, and a central portion therebetween,
   the first end being securable to the first mounting bracket,
   the second end being securable to the second mounting bracket, and
   the central portion being configured to be rotatably coupled to the vehicle chassis to stabilize the vehicle.

10. The kit of claim 9 further including:
   a front mounting bracket capable of being secured to a front chassis section of the vehicle, the front mounting bracket further including a bearing with an axial opening, wherein the central portion of the antisway bar is capable of passing through and being secured by the bearing to rotatably couple the central portion of the antisway bar to the chassis.

11. The kit of claim 10 wherein the bearing is made from ultra-high molecular weight polyethylene.

12. The kit of claim 9 wherein the central portion of the antisway bar has a diameter of less than 1.5 inches.

13. The kit of claim 10 wherein the antisway bar is made from 50,000 tensile strength mild steel.

14. A method of installing an antisway bar system on a vehicle suspension assembly comprising:
   installing a first mounting arrangement between a first airbag and a first kingpin;
   installing a second mounting arrangement between a second airbag and a second kingpin;
   securing a first end of an antisway bar into the first mounting arrangement;
   securing a second end of the antisway bar into the second mounting arrangement; and
   securing a central portion of the antisway bar into a central mounting arrangement that is secured to a vehicle frame to stabilize the vehicle.

15. The method of claim 14 wherein:
said step of installing the first mounting arrangement on the first axle assembly of the vehicle includes installing a first airbag mounting bracket including a first bearing for receiving and securing the first end of the antisway bar;
said step of installing the second mounting arrangement on the second axle assembly of the vehicle includes installing a second airbag mounting bracket including a second bearing for receiving and securing the second end of the antisway bar;
said step of securing the first end of the antisway bar into the first mounting arrangement includes securing the first end of the antisway bar into the first bearing of the first airbag mounting bracket; and
said step of securing the second end of the antisway bar into the second mounting arrangement includes securing the second end of the antisway bar into the second bearing of the second airbag mounting bracket.

16. The method of claim 14 wherein the step of "securing a central end of the antisway bar into a central mounting arrangement comprises:
securing a front mounting bracket to the vehicle, the front mounting bracket including a third bearing for receiving and rotatably securing a center portion of the antisway bar; and
securing the center portion of the antisway bar into the third bearing of the front mounting bracket.

17. The method of claim 14 further including:
removing a stock configuration antisway bar assembly from the vehicle chassis, wherein the stock configuration antisway bar assembly includes in its stock configuration: a left and a right lower A-arm assembly; a stock antisway bar having a first end and a second end; and an arrangement for mounting the first end to the right lower A-arm assembly and an arrangement for mounting the second end to the lower left A-arm assembly.

18. An vehicle antisway bar suspension assembly comprising:
a first mounting bracket secured between a first kingpin and a first airbag;
wherein the first mounting bracket includes a first plate, a second plate and a first housing between the first and second plate, wherein the first plate is fastened to the first king pin and the second plate is fastened to the first airbag;
a second mounting bracket secured between a second kingpin and a second airbag; wherein the second mounting bracket includes a third plate, a fourth plate, and a second housing between the third and fourth plates wherein the third plate is secured to the second kingpin and the fourth plate is secured to the second airbag;
an antisway bar having a first end, a second end, and a central portion;
the first end being rotatably secured into the first mounting bracket; and
the second end being rotatably secured into the second mounting bracket.

19. An antisway bar suspension assembly for use on a vehicle chassis comprising:
a first mounting arrangement coupled between a first kingpin and a first airbag;
a second mounting arrangement coupled between a second kingpin and a second airbag;
an antisway bar having a first end, a second end, and a central portion;
the first end being secured into the first mounting arrangement;
the second end being secured into the second mounting arrangement; and
a frame mounting bracket, the frame mounting bracket having an opening therethrough along an axial-direction of the frame mounting bracket and the central portion of the antisway bar being rotatably secured through the opening.

20. An antisway bar suspension assembly for use on a vehicle chassis comprising:
a first mounting arrangement coupled to a first kingpin and a first airbag;
a second mounting arrangement coupled to a second kingpin and a second airbag;
an antisway bar having a first end, a second end, and a central portion;
the first end being coupled to the first mounting arrangement; and
the second end being coupled to the second mounting arrangement,
a frame mounting bracket, the central portion of the antisway bar being rotatably coupled to the frame mounting bracket.

21. A method of installing an antisway bar system on a vehicle suspension assembly comprising:
installing a first mounting arrangement between a first airbag and a first kingpin;
installing a second mounting arrangement between a second airbag and a second kingpin;
securing a first end of an antisway bar into the first mounting arrangement; and
securing a second end of the antisway bar into the second mounting arrangement,
securing a front mounting bracket to the vehicle, the front mounting bracket including a third bearing for receiving and rotatably securing a center portion of the antisway bar; and
securing the center portion of the antisway bar into the third bearing of the front mounting bracket.

22. A method of installing an antisway bar system on a vehicle comprising:
installing a first mounting arrangement, the first mounting arrangement being coupled to a first airbag and a first kingpin;
installing a second mounting arrangement, the second mounting arrangement being coupled to a second airbag and a second kingpin;
coupling a first end of an antisway bar to the first mounting arrangement; and
coupling a second end of the antisway bar to the second mounting arrangement,
coupling a front mounting bracket to the vehicle, the front mounting bracket being coupled to a bearing for rotatably coupling to a central portion of the antisway bar; and
coupling the central portion of the antisway bar into the bearing of the front mounting bracket.

23. An antisway bar suspension assembly for use on a vehicle chassis comprising:
a first mounting arrangement coupled to a first airbag;

a second mounting arrangement coupled to a second airbag; and an antisway bar having a first end, a second end, and a central portion;

the antisway bar being secured into the first mounting arrangement at a first mounting location on the antisway bar, the first mounting location being closer to the first end than the second end;

the antisway bar being secured into the second mounting arrangement at a second mounting location on the antisway bar, the second mounting location being closer to the second end than the first end;

the antisway bar being coupled to the chassis between the first mounting location and the second mounting location.

* * * * *